United States Patent
Telfer et al.

(10) Patent No.: US 9,361,836 B1
(45) Date of Patent: Jun. 7, 2016

(54) AGGREGATE PARTICLES FOR USE IN ELECTROPHORETIC COLOR DISPLAYS

(71) Applicant: E INK CORPORATION, Billerica, MA (US)

(72) Inventors: Stephen J. Telfer, Arlington, MA (US); Richard J. Paolini, Jr., Framingham, MA (US); George G. Harris, Woburn, MA (US); Isaac W. Moran, Maynard, MA (US); Alain Bouchard, Boston, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 14/579,572

(22) Filed: Dec. 22, 2014

Related U.S. Application Data

(60) Provisional application No. 61/919,334, filed on Dec. 20, 2013.

(51) Int. Cl.
*G09G 3/34* (2006.01)
*G09G 3/20* (2006.01)

(52) U.S. Cl.
CPC .............. *G09G 3/344* (2013.01); *G09G 3/2003* (2013.01); *G09G 3/3433* (2013.01)

(58) Field of Classification Search
CPC ... G09G 3/3433; G09G 3/344; G09G 3/2003; G09G 3/3607
USPC .................................. 345/88–107, 204–215
See application file for complete search history.

(56) References Cited

U.S. PATENT DOCUMENTS

| | | | |
|---|---|---|---|
| 5,961,804 A | 10/1999 | Jacobson et al. | |
| 6,017,584 A | 1/2000 | Albert et al. | |
| 6,120,588 A | 9/2000 | Jacobson | |
| 6,120,839 A | 9/2000 | Comiskey et al. | |
| 6,241,921 B1 | 6/2001 | Jacobson et al. | |
| 6,262,706 B1 | 7/2001 | Albert et al. | |
| 6,262,833 B1 | 7/2001 | Loxley et al. | |
| 6,300,932 B1 | 10/2001 | Albert | |
| 6,323,989 B1 | 11/2001 | Jacobson et al. | |
| 6,377,387 B1 | 4/2002 | Duthaler et al. | |
| 6,515,649 B1 | 2/2003 | Albert et al. | |
| 6,538,801 B2 | 3/2003 | Jacobson | |
| 6,580,545 B2 | 6/2003 | Morrison et al. | |
| 6,652,075 B2 | 11/2003 | Jacobson | |
| 6,664,944 B1 | 12/2003 | Albert et al. | |
| 6,672,921 B1 | 1/2004 | Liang et al. | |
| 6,693,620 B1 | 2/2004 | Herb et al. | |
| 6,721,083 B2 | 4/2004 | Jacobson et al. | |
| 6,727,881 B1 | 4/2004 | Albert et al. | |
| 6,788,449 B2 | 9/2004 | Liang et al. | |
| 6,822,782 B2 | 11/2004 | Honeyman et al. | |
| 6,864,875 B2 | 3/2005 | Drzaic et al. | |
| 6,866,760 B2 | 3/2005 | Paolini Jr. et al. | |

(Continued)

*Primary Examiner* — Vijay Shankar
(74) *Attorney, Agent, or Firm* — David J. Cole

(57) ABSTRACT

A multi-color display device has front and rear electrodes on opposed sides of an electrophoretic medium. One of the front and rear electrodes occupies only a minor proportion of a pixel. The device has a voltage control capable of applying a first and a smaller second potential difference of either polarity between the electrodes. The electrophoretic medium has first and second species of particles of differing colors and charge polarities. The first and second particles move independently of one another in response to the first potential difference, but upon application of the second potential difference form charged aggregates, moving as a unit, having an aggregate color different from the first and second colors.

25 Claims, 10 Drawing Sheets

(56) References Cited

U.S. PATENT DOCUMENTS

| | | | |
|---|---|---|---|
| 6,870,661 B2 | 3/2005 | Pullen et al. | |
| 6,922,276 B2 | 7/2005 | Zhang et al. | |
| 6,950,220 B2 | 9/2005 | Abramson et al. | |
| 6,982,178 B2 | 1/2006 | LeCain | |
| 7,002,728 B2 | 2/2006 | Pullen et al. | |
| 7,012,600 B2 | 3/2006 | Zehner et al. | |
| 7,038,655 B2 | 5/2006 | Herb et al. | |
| 7,075,502 B1 | 7/2006 | Drzaic et al. | |
| 7,116,318 B2 | 10/2006 | Amundson et al. | |
| 7,167,155 B1 | 1/2007 | Albert et al. | |
| 7,170,670 B2 | 1/2007 | Webber | |
| 7,180,649 B2 | 2/2007 | Morrison et al. | |
| 7,230,750 B2 | 6/2007 | Whitesides et al. | |
| 7,230,751 B2 | 6/2007 | Whitesides et al. | |
| 7,236,290 B1 | 6/2007 | Zhang et al. | |
| 7,247,379 B2 | 7/2007 | Pullen et al. | |
| 7,312,784 B2 | 12/2007 | Baucom et al. | |
| 7,312,916 B2 | 12/2007 | Pullen et al. | |
| 7,411,719 B2 | 8/2008 | Paolini, Jr. et al. | |
| 7,411,720 B2 | 8/2008 | Honeyman et al. | |
| 7,420,549 B2 | 9/2008 | Jacobson et al. | |
| 7,453,445 B2 | 11/2008 | Amundson | |
| 7,532,388 B2 | 5/2009 | Whitesides et al. | |
| 7,535,624 B2 | 5/2009 | Amundson | |
| 7,561,324 B2 | 7/2009 | Duthaler | |
| 7,679,814 B2 | 3/2010 | Paolini, Jr. et al. | |
| 7,746,544 B2 | 6/2010 | Comiskey et al. | |
| 7,839,564 B2 | 11/2010 | Whitesides et al. | |
| 7,848,006 B2 | 12/2010 | Wilcox et al. | |
| 7,910,175 B2 | 3/2011 | Webber | |
| 7,952,790 B2 | 5/2011 | Honeyman et al. | |
| 8,009,348 B2 | 8/2011 | Zehner et al. | |
| 8,018,640 B2 * | 9/2011 | Whitesides et al. | 359/296 |
| 8,115,729 B2 * | 2/2012 | Danner et al. | 345/107 |
| 8,199,395 B2 * | 6/2012 | Whitesides et al. | 359/296 |
| 8,270,064 B2 * | 9/2012 | Feick et al. | 359/296 |
| 8,305,341 B2 * | 11/2012 | Arango et al. | 345/107 |
| 8,319,759 B2 | 11/2012 | Jacobson et al. | |
| 8,363,299 B2 | 1/2013 | Paolini, Jr. et al. | |
| 8,390,918 B2 | 3/2013 | Wilcox et al. | |
| 8,441,714 B2 | 5/2013 | Paolini, Jr. et al. | |
| 8,441,716 B2 | 5/2013 | Paolini, Jr. et al. | |
| 8,466,852 B2 | 6/2013 | Drzaic et al. | |
| 8,576,470 B2 | 11/2013 | Paolini, Jr. et al. | |
| 8,576,476 B2 | 11/2013 | Telfer et al. | |
| 8,582,196 B2 | 11/2013 | Walls et al. | |
| 8,593,718 B2 | 11/2013 | Comiskey et al. | |
| 8,593,721 B2 | 11/2013 | Albert et al. | |
| 8,704,754 B2 | 4/2014 | Machida et al. | |
| 8,797,634 B2 | 8/2014 | Paolini, Jr. et al. | |
| 8,830,559 B2 | 9/2014 | Honeyman | |
| 8,873,129 B2 | 10/2014 | Paolini, Jr. et al. | |
| 8,902,153 B2 | 12/2014 | Bouchard et al. | |
| 2005/0012980 A1 | 1/2005 | Wilcox et al. | |
| 2008/0043318 A1 | 2/2008 | Whitesides et al. | |
| 2008/0048970 A1 | 2/2008 | Drzaic et al. | |
| 2009/0004442 A1 | 1/2009 | Danner | |
| 2009/0009852 A1 | 1/2009 | Honeyman et al. | |
| 2009/0206499 A1 | 8/2009 | Whitesides | |
| 2009/0225398 A1 | 9/2009 | Duthaler et al. | |
| 2010/0103502 A1 | 4/2010 | Jacobson et al. | |
| 2010/0148385 A1 | 6/2010 | Balko et al. | |
| 2010/0156780 A1 | 6/2010 | Jacobson et al. | |
| 2011/0175939 A1 | 7/2011 | Moriyama et al. | |
| 2012/0293858 A1 | 11/2012 | Telfer et al. | |
| 2012/0326957 A1 | 12/2012 | Drzaic et al. | |

* cited by examiner

FIGURES

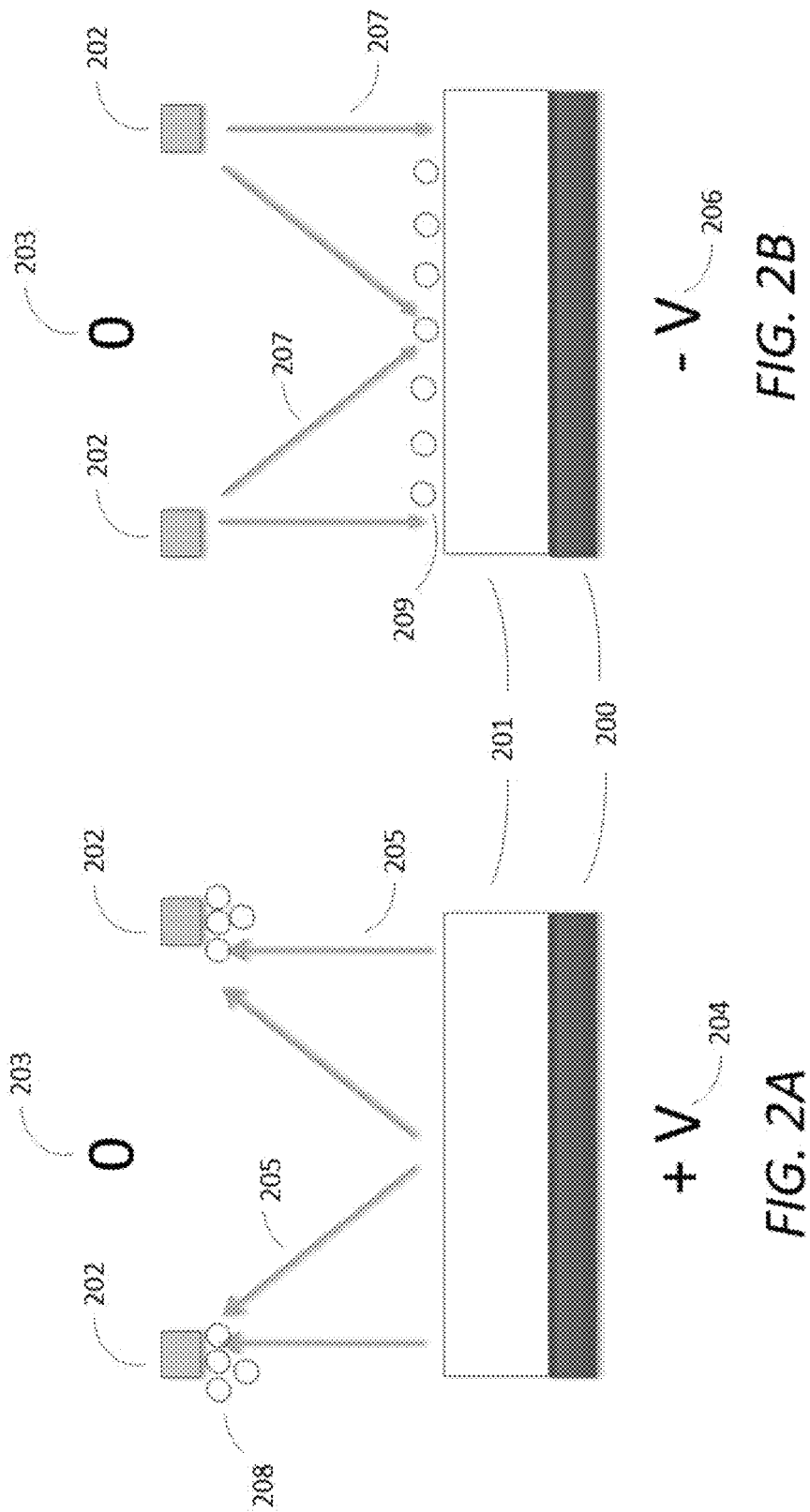

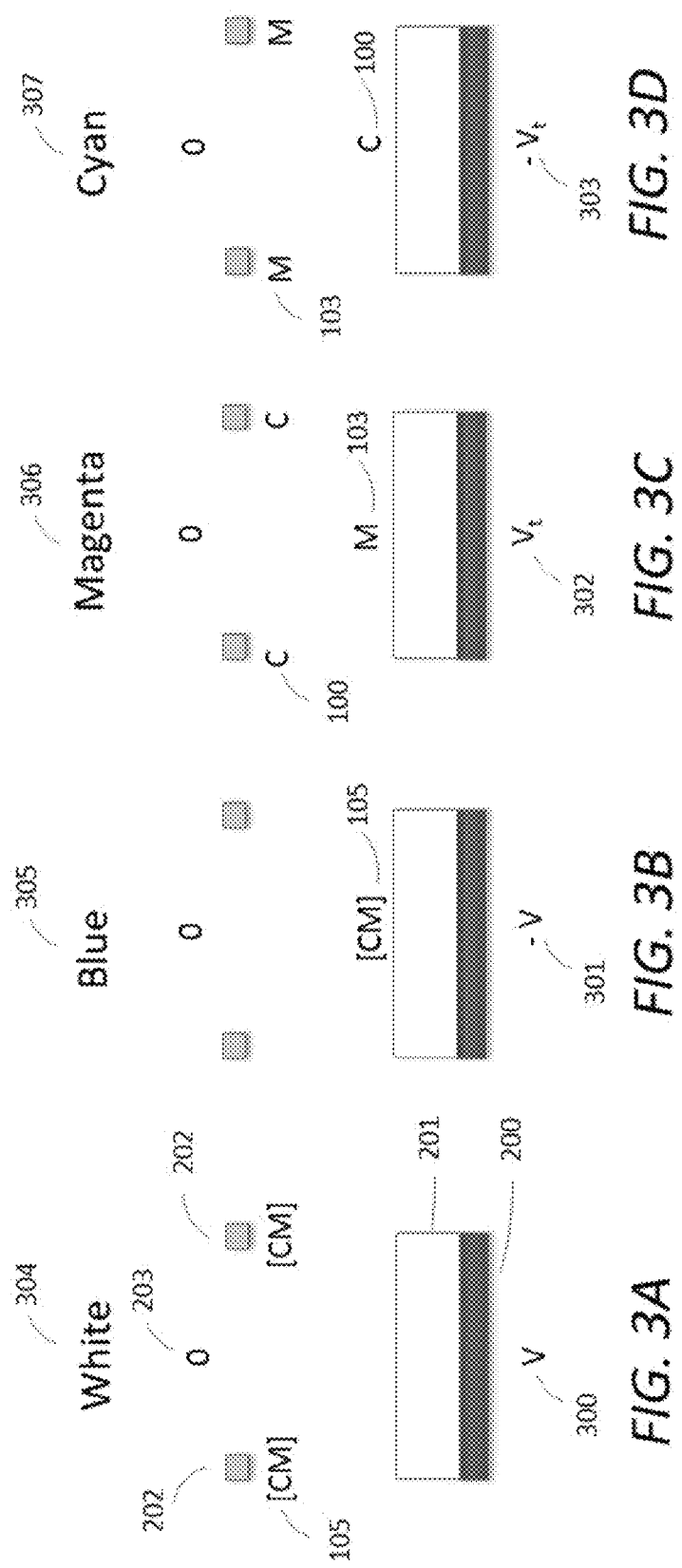

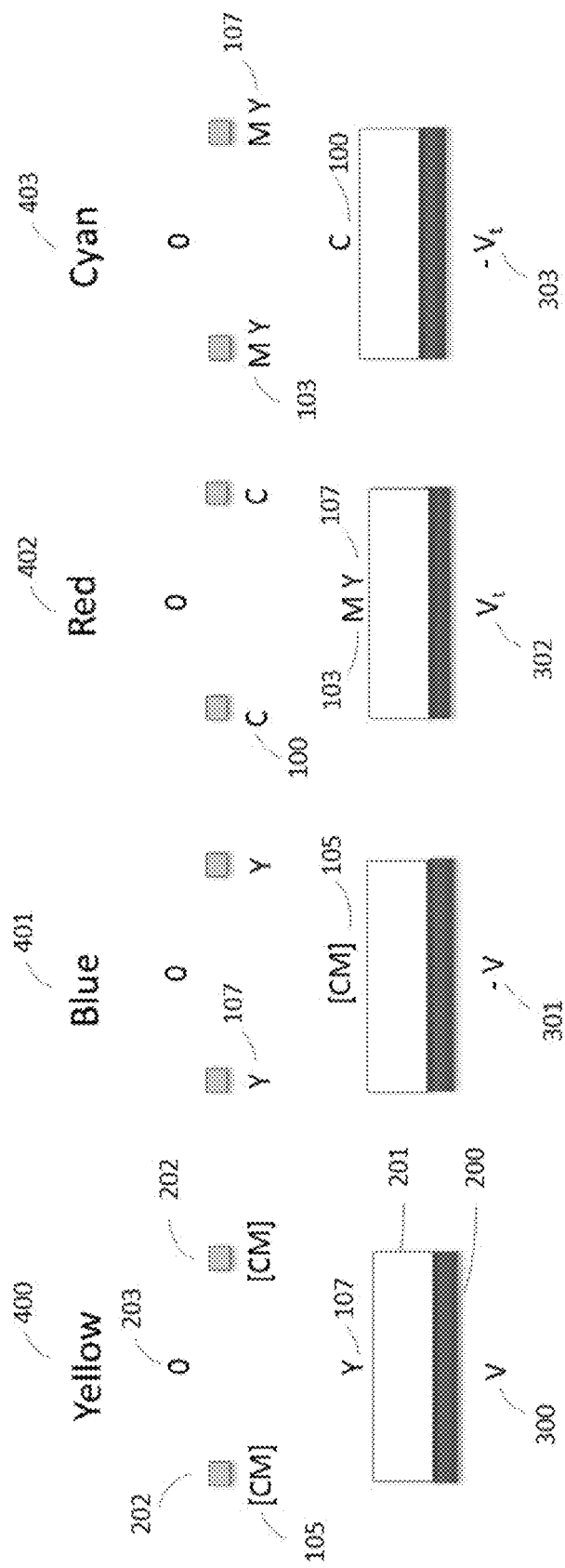

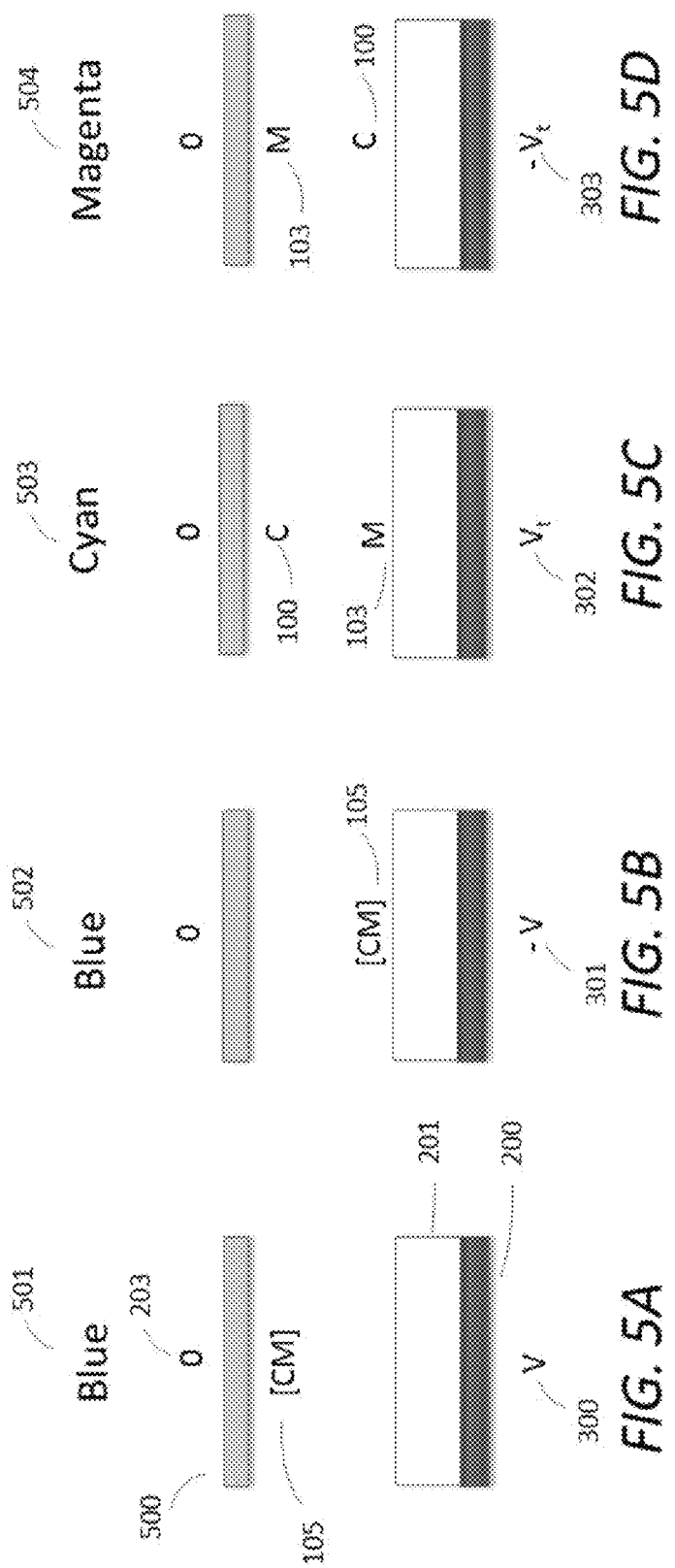

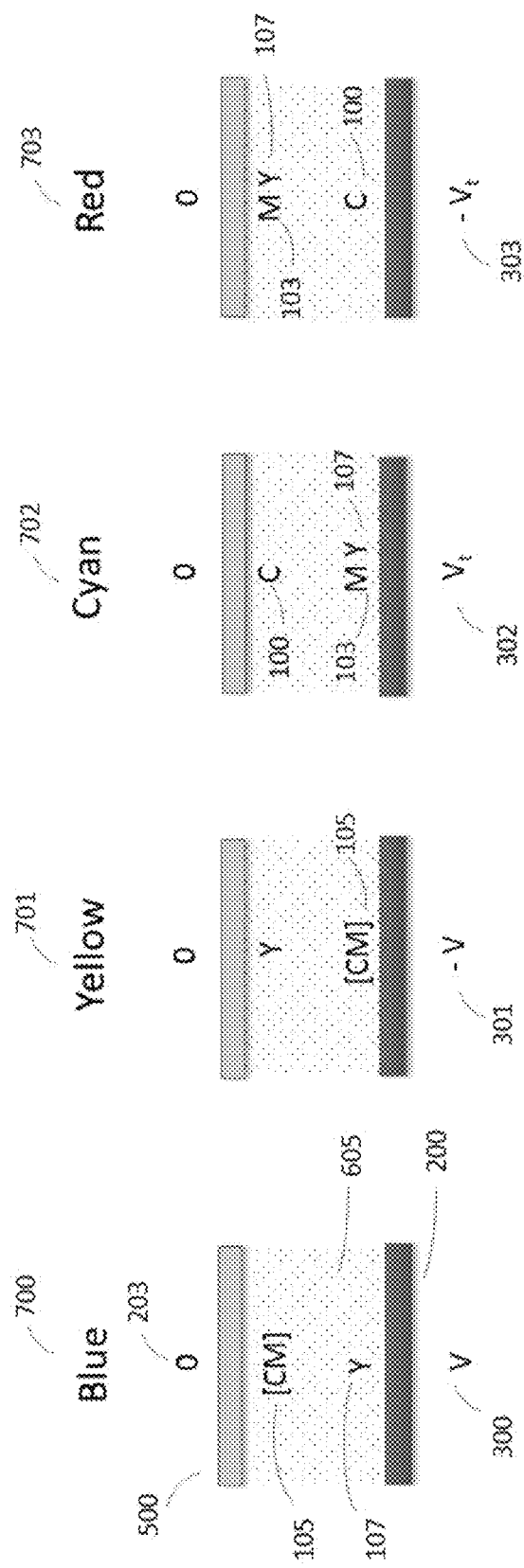

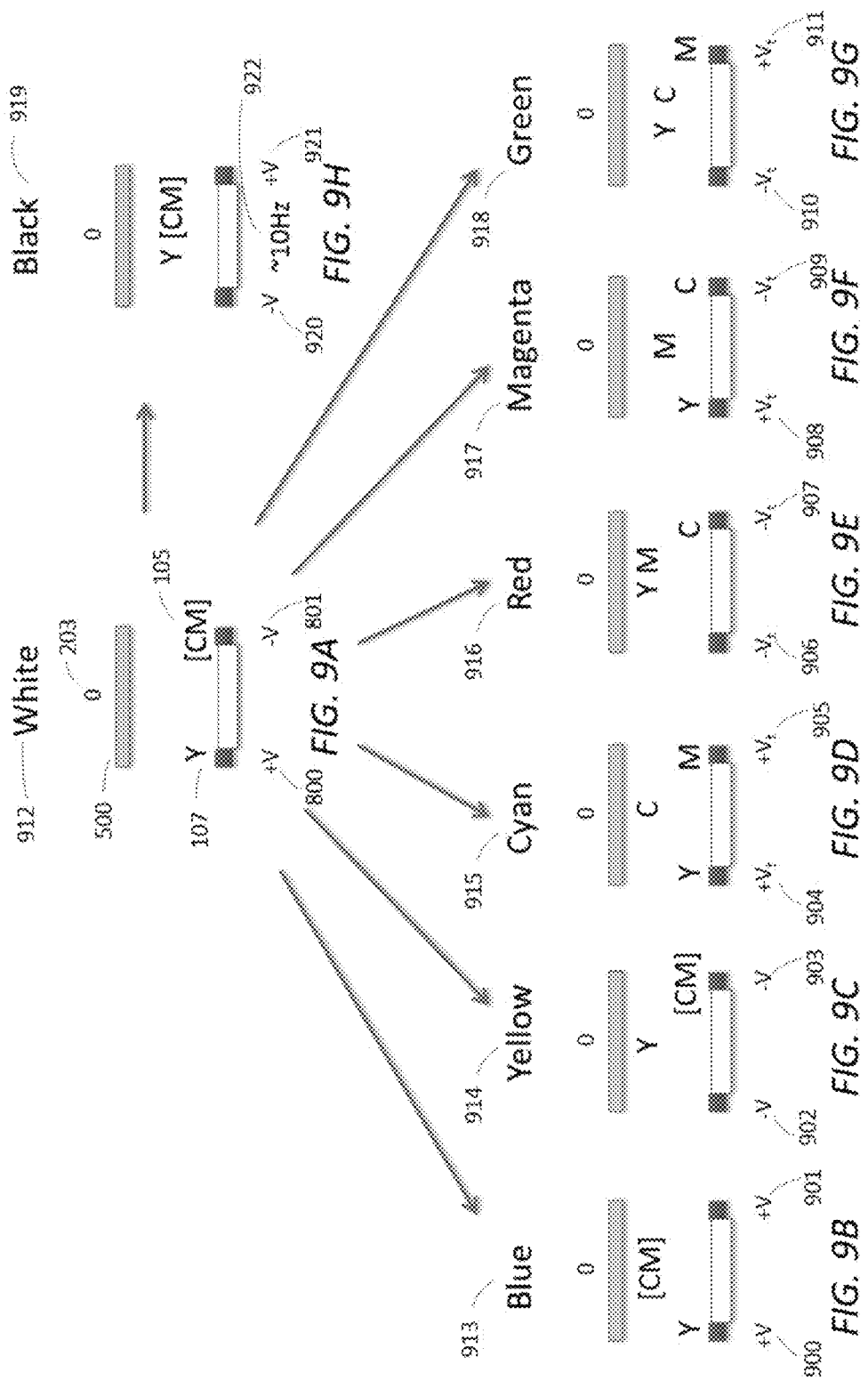

AGGREGATE PARTICLES FOR USE IN ELECTROPHORETIC COLOR DISPLAYS

REFERENCE TO RELATED APPLICATIONS

This application claims benefit of U.S. Provisional Application Ser. No. 61/919,334 filed on Dec. 20, 2013. The entire contents of this and all other U.S. patents and published and copending applications mentioned below are herein incorporated by reference.

BACKGROUND OF INVENTION

This invention relates to colored electrophoretic displays, and more specifically, to electrophoretic displays capable of rendering multiple colors using a single layer of electrophoretic material comprising a plurality of at least two types of charged particles that form aggregate particles.

In one aspect, this invention relates to the formation of aggregate particles in the presence of a threshold electrical field and the movement of aggregated particles across an electrophoretic layer in a direction that is different from at least one of its individual particles.

One type of electro-optic display, which has been the subject of intense research and development for a number of years, is the particle-based electrophoretic display, in which a plurality of charged particles moves through a fluid under the influence of an electric field.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,870,661; 7,002,728; 7,038,655; 7,170,670; 7,180,649; 7,230,750; 7,230,751; 7,236,290; 7,247,379; 7,312,916; 7,375,875; 7,411,720; 7,532,388; 7,679,814; 7,746,544; 7,848,006; 7,903,319; 8,018,640; 8,115,729; 8,199,395; 8,270,064; and 8,305,341; and U.S. Patent Applications Publication Nos. 2005/0012980; 2008/0266245; 2009/0009852; 2009/0206499; 2009/0225398; 2010/0148385; 2010/0207073; and 2011/0012825;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 6,017,584; 6,664,944; 6,864,875; 7,075,502; 7,167,155; 7,667,684; 7,791,789; 7,956,841; 8,040,594; 8,054,526; 8,098,418; 8,213,076; and 8,363,299; and U.S. Patent Applications Publication Nos. 2004/0263947; 2007/0109219; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0157269; and 2012/0326957;

(f) Methods for driving displays; see for example U.S. Pat. Nos. 7,012,600 and 7,453,445;

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

SUMMARY OF INVENTION

This invention provides an electrophoretic display having a single electrophoretic layer that provides for multiple color states based on at least two types of charged particles that form aggregate particles that cannot be separated when an applied electrical field is below a threshold and that can be separated when an applied electrical field is above a threshold, where the aggregated particles move in a direction that is different from at least one of its individual particles.

The electrophoretic layer comprises a plurality of at least two types of charged particles dispersed in a fluid and capable of moving through the fluid in response to an electrical field being applied to the layer. The charged particles include a first particle that has a greater and opposite charge from a second particle. When aggregated, the first and second particles move as a unit according to the overall charge of the aggregate. The second particle moves in a first direction when the applied electric field is below a threshold (i.e., when aggregated) and in a second direction different from the first direction when the electric field exceeds the threshold (i.e., when not aggregated).

The charged particles may be pigments having a first color and a second pigment having a second color that is different from the first color. One of the colors may be colorless. The aggregated particles may display a color that is different from the colors of the individual particles. If the first and second colors are subtractive primary colors, the aggregate of the first and second particles will display the combined color.

In one form of the present invention, each pixel of the electrophoretic display may have one or more grid-like front electrodes (i.e., electrodes which occupy only a minor proportion of the area of the pixel) and a backplane incorporating an electrode and a white reflector. When the backplane is held positive relative to the front electrode(s), positively charged particles move adjacent the front grid electrode(s) to occupy only a minor proportion of the area of the pixel and are effectively hidden. When the backplane is held negative relative to the front electrode(s), positively charged particles move adjacent and spread over the backplane (or, strictly speaking, over the electrode in the backplane). The color of the charged particles spread over the backplane is displayed. When particles are not spread over the backplane, the white color of the reflector is displayed. Different color states may be displayed depending on the magnitude and polarity of the electrical field applied. When an applied electrical field is below the threshold required to deaggregate the first and second particles, white or the color of the aggregate of the first and second particles is displayed depending on the polarity of the applied field. When an applied electrical field exceeds this threshold, the colors of the deaggregated first and second particles are displayed depending on the polarity of the applied field.

In another form of the present invention, the electrophoretic layer may comprise a third particle with sufficient steric repulsion to prevent it from forming aggregates with either the first or second particles. The third particle may bear the same charge as the second particle, in sign and magnitude, or may bear a charge of a greater magnitude, and moves in the same direction as the unaggregated second particle. The third particle may be a pigment having a third color that provides for at least four color states to be displayed by varying the charge of the applied electrical field above and below the threshold.

In another form of the present invention, each pixel of the electrophoretic display may comprise a single front electrode. Depending on the applied electrical field, charged particles move toward and spread over the front electrode to create a color state. In a single front electrode arrangement, when an applied electrical field is below a threshold, whether positive or negative, the color of the aggregate of the first and second particles will be displayed. The aggregate of the first and second particles will spread over the front or rear electrode depending on its charge, and with only two particle types, the aggregate color will be visible when spread over the back plane. When the applied electrical field exceeds the threshold, the first and second particles deaggregate and move according to their individual charges. When the first particles spread over the single front electrode, a first color is displayed. When the second particles spread over the single front electrode, a second color is displayed. When a third particle is included in the electrophoretic layer, at least four color states may be displayed by varying the applied electrical field above and below the threshold.

In another form of the present invention, the electrophoretic display may comprise a single front electrode and an arrangement of individually-addressable, backplane electrodes, at least two per pixel, a white reflector, and first, second and third particles. Different color states may be obtained by varying the applied electrical fields between positive and negative, and below and above the threshold. Additional color states may be obtained by applying potentials of opposite polarity to the backplane electrodes. An additional color state may be maintained by addressing with low-frequency AC to induce swirling so that the particles are mixed.

This invention also provides an electronic book reader, portable computer, tablet computer, cellular telephone, smart card, sign, watch, shelf label, variable transmission window or flash drive comprising a display of the present invention.

BRIEF DESCRIPTION OF DRAWINGS

FIGS. 2A-2B are schematic side elevations of a single pixel of an electrophoretic display having a grid-like front electrode and a white reflective backplane, and show the movement of positively charged particles when the rear electrode is made positive and negative, respectively, relative to the front electrode;

FIGS. 3A-3D are schematic side elevations of a single pixel of an electrophoretic display of the present invention, generally similar to that shown in FIGS. 2A-2B, the display comprising cyan and magenta particles capable of aggregation to form a blue aggregate;

FIGS. 4A-4D are schematic side elevations of a single pixel of an electrophoretic display of the present invention generally similar to that shown in FIGS. 3A-3D but also including yellow particles which do not aggregate;

FIGS. 5A-5D are schematic side elevations of a single pixel of an electrophoretic display of the present invention generally similar to that shown in FIGS. 3A-3D but having a single light-transmissive front;

FIGS. 7A-7D are schematic side elevations of a single pixel of an electrophoretic display of the present invention generally similar to that shown in FIGS. 5A-5D but in which the electrophoretic medium comprises yellow particles;

FIGS. 9A-9H are schematic side elevations of a single pixel of an electrophoretic display of the present invention generally similar to that shown in FIGS. 8A-8B but having cyan, magenta and yellow particles in the electrophoretic medium;

DETAILED DESCRIPTION

Figures 1A, 1B:
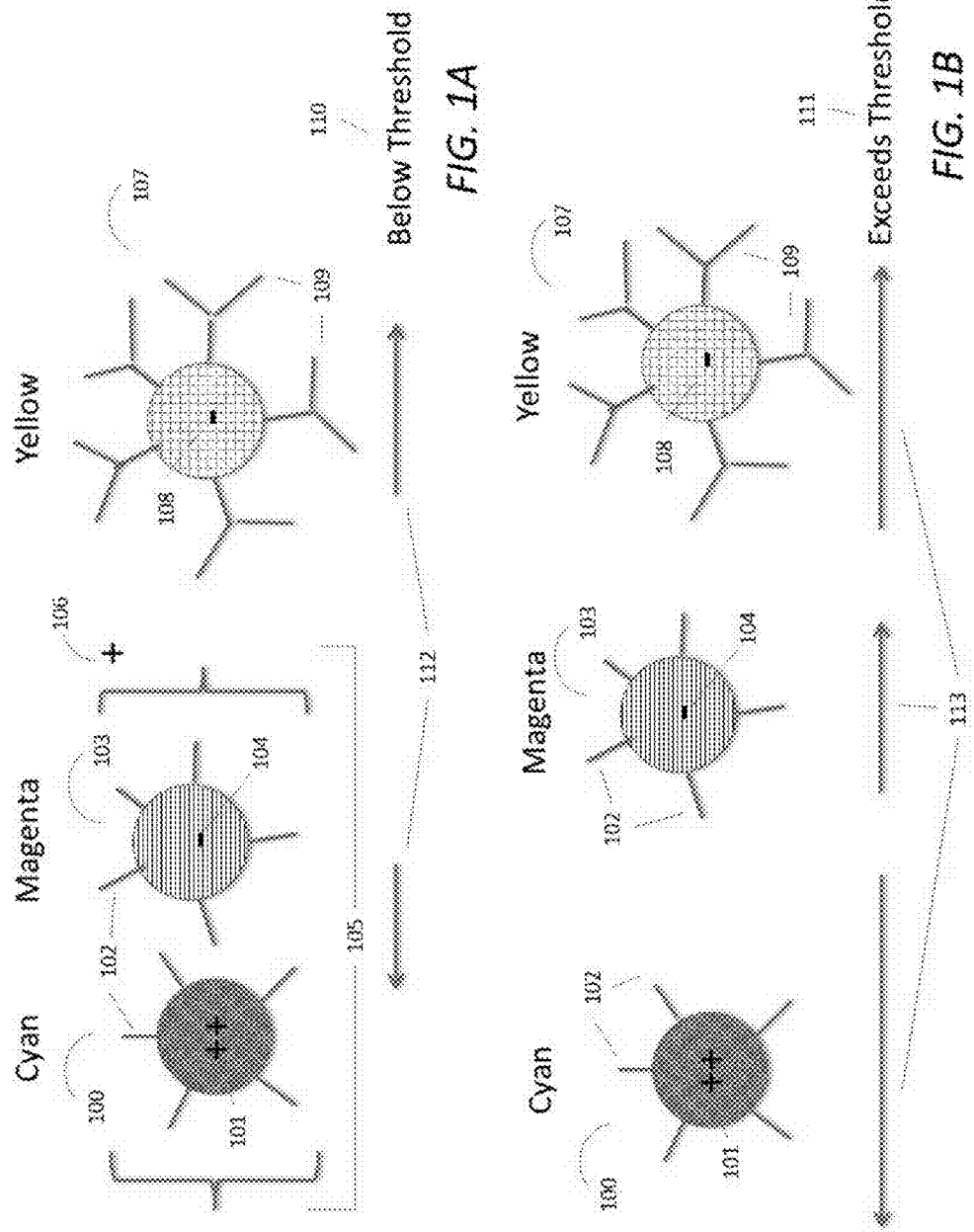
FIG. 1A is a schematic illustration showing the interaction of three charged particles, including aggregated particles, when an electrical field that is below a threshold is applied.
FIG. 1B is a schematic illustration showing the interaction of the three charged particles shown in FIG. 1A when an electrical field that exceeds the threshold is applied.

As indicated above, the present invention provides an electrophoretic display having a single electrophoretic layer that provides for multiple color states based on at least two types of charged particles that form aggregate particles that cannot be separated when an applied electrical field is below a threshold and that can be separated when an applied electrical field is above a threshold, where the aggregated particles move in a direction that is different from at least one of its individual particles.

The electrophoretic layer comprises a plurality of two types of charged particles dispersed in a fluid and capable of moving through the fluid in response to an electrical field applied to the layer. The charged particles include a first particle that has a greater charge and opposite charge from a second particle. The second particle moves in a first direction when the applied electric field is below a threshold (i.e., when aggregated) and in a second direction different from the first direction when the electric field exceeds the threshold (i.e., when not aggregated).

Aggregated particles may be formed by Coulombic attraction. The electrostatic interaction between electrically charged particles is described by Coulomb's law. This interaction is affected by the distance between the particles and their relative charges. Like charges repel each other and opposite charges attract each other. In its simplest form, Coulomb's law states that the magnitude of the electrostatic force of interaction between two charged particles is directly proportional to the product of the magnitudes of the charges and inversely proportional to the square of the distance between them. The force is along the straight line joining their center of charge. If the charges have the same sign, the electrostatic force between them is repulsive. If the charges have different signs, the force between them is attractive. The mathematical expression of Coulomb's law in scalar form is:

$$|F| = k_e \frac{|q^1 q^2|}{r^2}$$

where $k_e$ is Coulomb's constant, $q^1$ and $q^2$ are the signed magnitudes of the charges and r is the distance between the charges. Coulomb's law is fully accurate only when the particles are stationary. It is approximately correct for slow moving particles such as the particles in this invention.

Other reversible means of aggregation of particles may be used in the practice of the present invention. For example, aggregate particles may be formed by depletion flocculation where particles aggregate by size.

The charged particles may be pigments having a first color and a second pigment having a second color that is different from the first color. The pigments may be any color, including black or white. The pigments may be subtractive primary colors, additive primary colors, or a combination thereof. One of the pigments may be colorless. The pigments may be reflective, light-transmissive or a combination thereof. The aggregated particles may display a color that is different from the colors of the individual particles. If the first and second colors are light-transmissive and subtractive primary colors, the aggregate of the first and second particles will display the color resulting from the combination of the two subtractive primaries.

FIG. 1A shows the interaction of three particles in an applied electric field that is below a threshold (110). The three particles are charged pigments where the cyan particle (100) has a two unit positive charge (101), the magenta particle (103) has a single unit negative charge (104) and the yellow particle (107) has a single unit negative charge (108) with sufficient steric bulk, as indicated by the long arms extending from the pigment surface (109), to prevent the yellow particle from forming aggregates or to enable it only to form weak aggregates. The cyan and magenta particles form an aggregate (105) because the steric repulsion, as indicated by short arms extending from the particle surfaces (102), is insufficient to prevent the particles from approaching each other closer than the Bjerrum length, at which the electrostatic potential energy and the thermal energy become comparable. Any such aggregate has a threshold electrical field which will cause deaggregation. An electrical field below the threshold cannot prevent or overcome the aggregate forces, while an electrical field above the threshold will cause deaggregation of the particles. An electrical field below the threshold is designated as V or −V in the Figures. Although designated as V, the electrical fields may be of different magnitudes. In the presence of an electric field that is below the threshold, the aggregate of the particles (105) moves as a unit (112) according to its overall (one unit positive) charge (106). The overall charge of the aggregate (106) will have the same sign as that of the more highly charged of the component particles. In this example, the aggregate (105) has the same sign as the cyan particle (100). Cyan and magenta are subtractive primary colors so the cyan and magenta aggregate will be blue in color.

FIG. 1B shows the interaction of the three particles (100, 103, 107) when the electrical field applied exceeds the threshold value (111) to overcome the aggregate attraction. When the electric field applied exceeds the threshold, the cyan particle (100) does not form a stable aggregate with the magenta particle (103) because electrostatic forces on each component particle will be sufficient to overcome the Coulombic forces and break apart the aggregate such that each of the component particles will move separately according to its individual charge (113). An electrical field that exceeds the threshold is designated as $V_t$ or $-V_t$ in the Figures. In FIG. 1B, the deaggregated magenta particle (103) moves as a negatively charged particle (104) in a direction opposite to that in which it moves when present in the aggregate (105) (FIG. 1A). As illustrated, in a low (below threshold) applied field (110), the cyan and magenta aggregate (105) will move in the opposite direction of the yellow particle (112). In a high (above threshold) applied field (111), the cyan particle (100) will move in the opposite direction (113) to both the magenta (103) and the yellow (107) particles.

FIG. 2A shows a single pixel of an electrophoretic display having a grid-like front electrode (202), which occupies only a minor proportion of the area of the pixel, and a backplane (200) incorporating a white reflector, for example, a white, electrically conductive layer that may be a lamination adhesive (201). In such a display, when the backplane is at a positive potential (204) relative to the front electrode (203) shown as ground, positively charged particles move as shown by the arrows (205), concentrating at the grid electrodes (208) (and thereby becoming essentially invisible, hidden by the electrodes) so that the white reflector is visible.

FIG. 2B shows the same pixel as in FIG. 2A with the backplane at a negative potential (206) relative to the front electrode (203), positively charged particles move as shown by the arrows (207) to spread over the white reflector (201). If the positively charged particles are pigmented, the particle color is visible when spread out against the white background (209). Thus, the pixel shown in FIGS. 2A and 2B forms part of a shuttering display having two states: white and colored.

Alternatively, a negatively charged particle may be used and will move in the opposite direction of the arrows, concentrating at the grid electrodes when the backplane is at a negative potential relative to the grid and spreading out against the white background of the lamination adhesive when the backplane is at a positive potential relative to the background. In another alternative, the charged particle is an aggregate of particles. For example, an aggregate of cyan and magenta will display blue. In the electrophoretic layer, the total amount of cyan particle charge should exceed the total amount of magenta charge so that the total cyan charge is not neutralized and remains available for charging the aggregate.

FIGS. 3A-3D show four different color states obtained from a pixel generally similar to that shown in FIGS. 2A-2B but comprising two particles of different colors (cyan and magenta particles are illustrated) capable of aggregation. Any two colors may be used. The display is addressed using two different voltages, one of which provides sufficient electric field to break apart the aggregates (302, 303), and the other of which does not (300, 301). In this example, five levels of electrical field are provided: positive and negative below the threshold (300, 301), positive and negative above the threshold (302,303) and zero (203). In a preferred embodiment, the white background is reflective and the particle pigments are light-transmissive, subtractive primary colors. The aggregate particles may be formed by applying an alternating electric field to mix or swirl the individual particles.

FIG. 3A shows that when the applied field is below the threshold and positive (300), the aggregate of cyan and magenta (105), which appears blue, travels as an aggregate to the front grid electrodes giving a white state (304) similar to that shown in FIG. 2A.

FIG. 3B shows that when the applied field is below the threshold and negative (301), the aggregate travels to the backplane giving a blue color state (305) similar to that shown in FIG. 2B.

As shown in FIGS. 3C & 3D, when the applied field exceeds the threshold (302, 303), the particles deaggregate and move according to their individual charges (100, 103) and the pure subtractive primary color states, magenta (306) and cyan (307), are obtained. FIG. 3C shows that when the field is positive and the threshold is exceeded (302), the positively charged cyan particles (100) concentrate at the grid electrodes (202) and are effectively hidden, while the negatively charged magenta particles (103) spread out and are visible against the white background to give a magenta state (306).

FIG. 3D shows that when the field is negative and the threshold is exceeded (303), the negatively charged magenta particles (103) concentrate at the grid electrodes (202), and are effectively hidden, while the positively charged cyan particles (100) spread out and are visible against the white background to give a cyan state (307).

In practice, a display uses a multitude of cyan and magenta particles. The aggregated particles may be comprised of two particles or of a larger number of particles that move through the fluid as a unit. The counter-ions to the charged species have been omitted from FIGS. 3A-3D for clarity. In a dispersion of pigment particles in a solvent of low dielectric constant containing a charge-control agent (CCA), electrical neutrality will be maintained.

It should be noted that although each component particle is shown as colored, the particles may be colorless, colored (including black or white), light-transmissive, reflective, or a combination thereof. When an applied field is below the threshold, if one of the primary components is colorless and the other colored, and the colorless particle has a higher charge than the colored particle, the colored particle will appear to move in a direction opposite of the direction it moves when an applied field exceeds the threshold.

FIGS. 4A-4D show different color states may be obtained from a single pixel of a display generally similar to that shown in FIGS. 3A-3D but also comprising a third particle with substantial steric bulk attached to its surface (107). In this example, the charge of the particle with the higher steric repulsion is opposite the combined charge of the aggregated particles. A combination of cyan (100), magenta (103) and yellow (107) pigmented particles is illustrated, although any colors may be used. Addressing of the display is similar to that in FIGS. 3A-3D using five voltages: positive and negative below the threshold (300, 301), positive and negative above the threshold (302, 303) and zero (203). In a preferred embodiment, the white background is reflective and the particle pigments are light-transmissive.

As shown in FIG. 4A, when the applied field is positive and below the threshold (300), the aggregate of cyan and magenta (105) travels as a positively charged unit to the electrodes (202), while the negatively charged yellow particles (107) spread over the backplane to display a yellow state (400).

In FIG. 4B, when the applied field is negative and below the threshold (301), the aggregate of cyan and magenta, which appears blue, travels as a positively charged unit to spread over the backplane to display a blue state (401), while the negatively charged yellow particles concentrate at the grid electrodes.

As shown in FIGS. 4C & 4D, when the applied field exceeds the threshold (302, 303), the particles deaggregate and move according to their individual charges and the color displayed changes in accordance with subtractive primary color mixtures. In FIG. 4C, when the field is positive and the threshold is exceeded (302), the positively charged cyan particles concentrate at the grid electrodes and are effectively hidden, while the negatively charged magenta (103) and yellow (107) particles spread over the backplane to display a red state (402). In FIG. 4D, when the field is negative and the threshold is exceeded (303), the negatively charged magenta (103) and yellow (107) particles move separately and concentrate at the grid electrodes (202), while the positively charged cyan particles spread over the backplane to display a cyan state (403).

FIGS. 5A-5D show how four different color states may be obtained from a single pixel generally similar to that shown in FIGS. 3A-3D but using a single front electrode (500). Addressing of the display is similar to that of FIGS. 3A-3D and 4A-4D using five levels of electrical field: positive and negative below the threshold, positive and negative above the threshold and zero. In a preferred embodiment, the particle pigments are reflective.

As shown in FIG. 5A, when the applied field is positive and below the threshold, the aggregate of cyan and magenta travels as a positively charged unit to the front plane giving a blue state (501). As shown in FIG. 5B, when the electric field is negative and below the threshold, the cyan-magenta aggregate spreads over the backplane giving a blue state (502).

When the applied field exceeds the threshold, the particles deaggregate and move according to their individual charges and the pure subtractive primary color states, magenta and cyan, are obtained. As shown in FIG. 5C, when the field is positive and the threshold is exceeded (302), the positively charged cyan particles (100) concentrate at the front plane giving a cyan state (503), while the negatively charged magenta particles spread out against the white background and are masked by the cyan particles (100). As shown in FIG. 5D, when the field is negative and the threshold is exceeded (303), the negatively charged magenta particles concentrate at the front plane giving a magenta state (504), while the positively charged cyan particles spread over the white background and are masked by the magenta particles (103).

In practice, a display uses a multitude of cyan and magenta particles. The aggregated particles may be comprised of two particles or of a larger number of particles that move through the fluid as a unit. The counter-ions to the charged species have been omitted from FIGS. 5A-5D for clarity. In a preferred embodiment, the white background and the particle pigments are reflective.

FIGS. 6A-6D show how four different color states may be obtained from a single pixel generally similar to that shown in FIGS. 5A-5D but in which the electrophoretic medium comprises neutral, white reflective particles. The neutral, reflective white particles (605) represented by the dots is dispersed within the fluid and do not move in response to an electric field. Addressing of the backplane is similar to that of FIGS. 3A-3D, 4A-4D and 5A-5D using five levels of electrical field: positive and negative below the threshold, positive and negative above the threshold and zero.

Figures 6A, 6B, 6C, 6D:
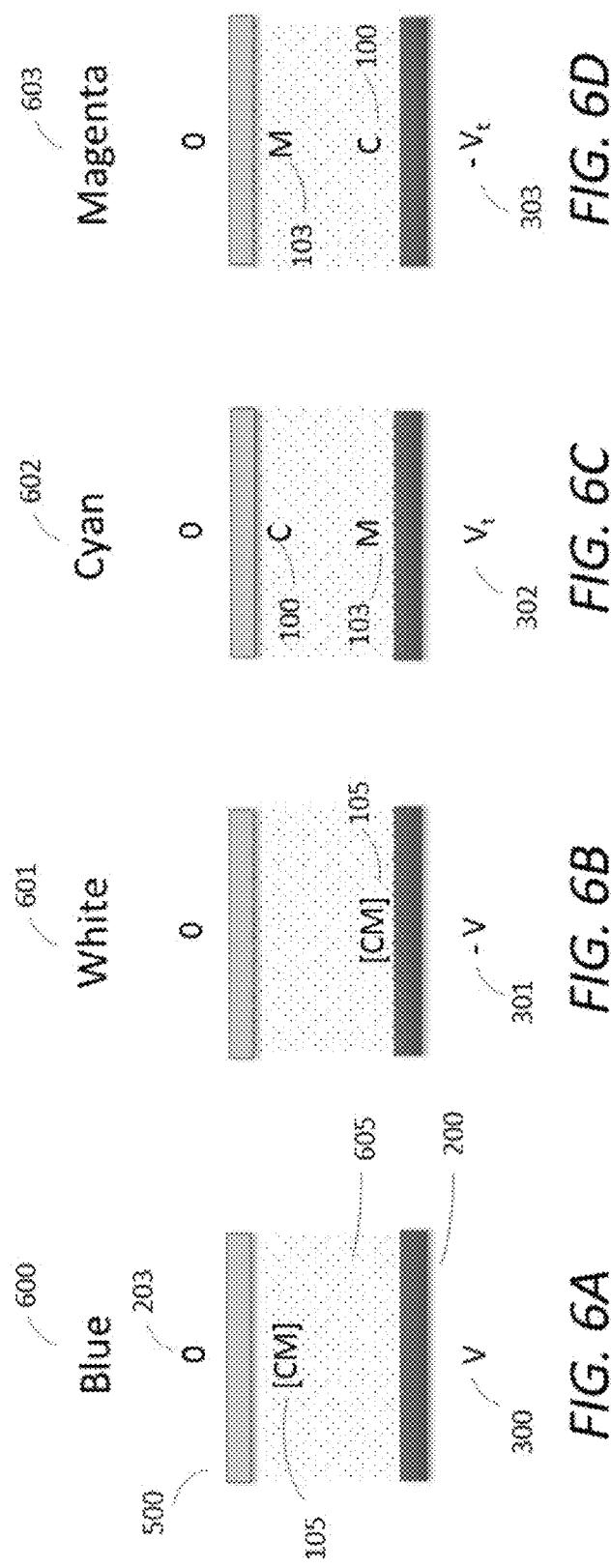
FIGS. 6A-6D are schematic side elevations of a single pixel of an electrophoretic display of the present invention generally similar to that shown in FIGS. 5A-5D but in which the electrophoretic medium comprises suspended, neutral white particles.

FIG. 6A shows that when the applied field is positive and below the threshold (300), the aggregate particles of cyan and magenta (105) spread over the front plane, as described in FIG. 5A, giving a blue state (600).

FIG. 6B shows that when the applied field is negative and below the threshold (301), the aggregate of cyan and magenta (105) spreads over the backplane and the dispersed white particles reflect and scatter light giving a white state (601) and masking the aggregates adjacent the backplane.

As shown in FIG. 6C, when the field is positive and the threshold is exceeded (302), the positively charged cyan particles concentrate at the front plane electrode giving a cyan state (602), while the negatively charged magenta particles spread over the backplane and are effectively masked.

In FIG. 6D, when the field is negative and the threshold is exceeded (303), the negatively charged magenta particles concentrate at the front plane electrode giving a magenta state (603), while the positively charged cyan particles spread over the backplane and are effectively masked. In a preferred embodiment, the white particles are reflective and the pigment particles are light-transmissive. In another embodiment, the white particles and the pigment particles are reflective.

FIGS. 7A-7D show how four different color states may be obtained from a single pixel generally similar to that shown in FIGS. 6A-6D but in which the electrophoretic medium further comprises a particle with substantial steric bulk attached to its surface. The charge of the particle with the higher steric repulsion is opposite the combined charge of the aggregated particles. Addressing of the display is similar to that of FIGS. 6A-6D using five levels of electrical field: positive and negative below the threshold, positive and negative above the threshold and zero.

As shown in FIG. 7A, when the applied field is positive and below the threshold (300), the aggregate of cyan and magenta (105) travels as a positively charged unit to spread over the front plane to display a blue state (700) while the negatively charged yellow particles (107) concentrate at the back plane and are effectively masked. As shown in FIG. 7B, when the applied field is negative and below the threshold (301), the aggregate of cyan and magenta travels as a unit to the backplane while the negatively charged yellow particles spread over the front plane to display a yellow state (701).

FIGS. 7C & 7D illustrate that when the applied field exceeds the threshold, the particles move according to their individual charges and the color displayed changes in accordance with subtractive and additive primary color mixtures. As shown in FIG. 7C, when the field is positive and the threshold is exceeded (302), the positively charged cyan particles (100) concentrate at the front plane electrode giving a cyan state (702), while the negatively charged magenta and yellow particles spread over the backplane and are effectively hidden. As shown in 7D, when the field is negative and the threshold is exceeded (303), the negatively charged magenta (103) and yellow (107) particles move separately and concentrate at the front plane electrode giving a red state (703), while the positively charged cyan particles spread over the backplane. In a preferred embodiment, the white particles are reflective and the pigment particles are light-transmissive. In another embodiment, the white particles and the pigment particles are reflective.

Figures 8A, 8B:
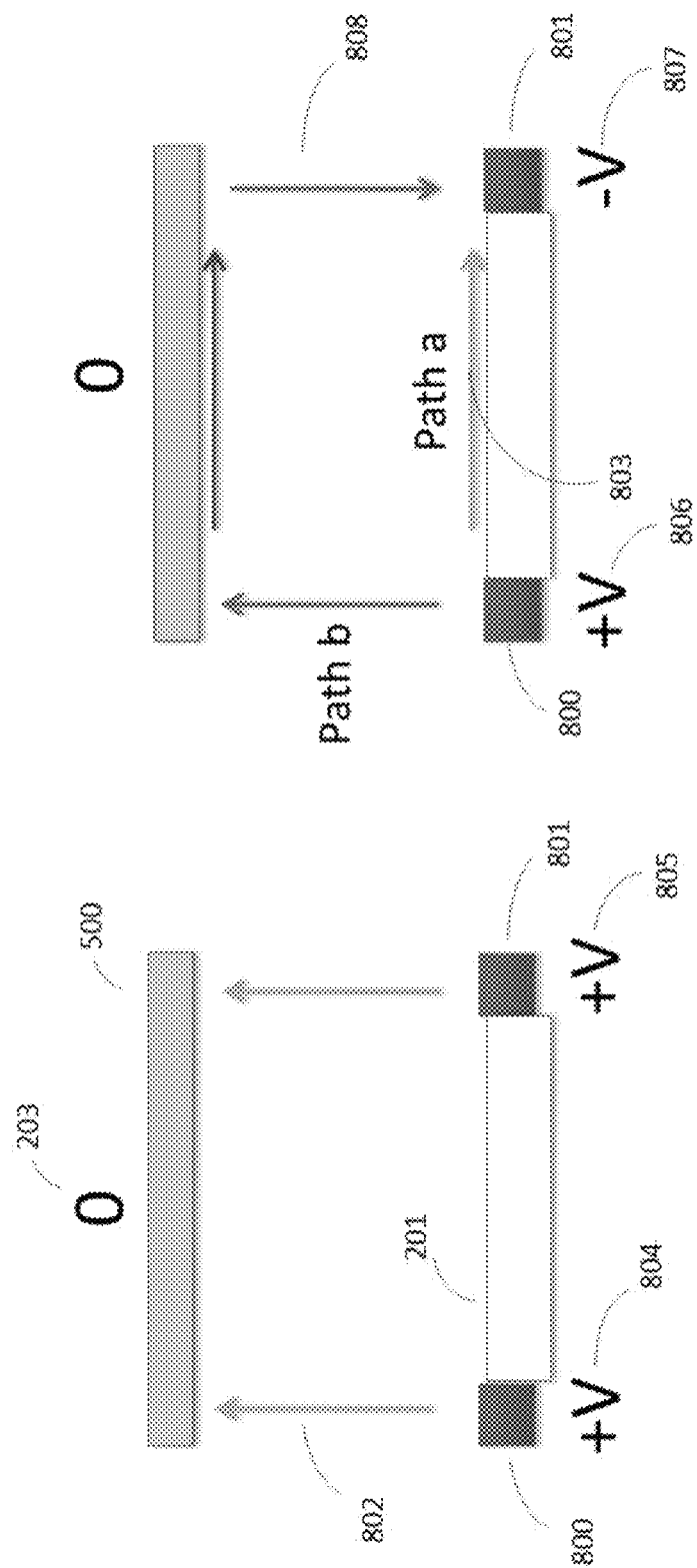
FIGS. 8A-8B are schematic side elevations of a single pixel of an electrophoretic display of the present invention having a single front electrode, a white, reflective backplane and two individually-addressable, backplane electrodes, FIG. 8A showing the movement of positively charged particles when both rear electrodes are held positive to the front electrode and FIG. 8B the movement when one rear electrode is held positive and the other negative relative to the front electrode.

FIGS. 8A & 8B show a single pixel of a display in which each pixel has a single front electrode (500) and a plurality of individually-addressable, lateral backplane electrodes (two backplane electrodes 800, 801 are illustrated but more could be provided). The front electrode (500) is maintained at a potential (203) such that each backplane electrode 800, 801 can be positive or negative relative thereto, and typically at ground. The two backplane electrodes can be at the same potential (804, 805) or they can be at opposite potentials (806, 807). If the backplane electrodes are at the same potential, charged particles travel towards the front or back plane depending on the charge of the particles and the charge of the electrical field.

FIG. 8A illustrates the path of a positively charged particle (802) when both backplane electrodes are at a positive potential relative to the front plane. FIG. 8B illustrates the paths a positively charged particle may travel (803, 804) when the lateral electrodes are at opposite potentials. The path the particles travel may be determined by adjusting the spacing between the layers and the resistance of the electrophoretic fluid. If Path a (803) is optimized, the particles travel across the backplane from one lateral electrode to the other. If Path b (808) is optimized, the particles travel across the fluid towards the front plane, across the front plane and back across the fluid towards the other backplane electrode.

FIGS. 9A-9H show how eight different color states may be obtained from a single pixel of a display having the same electrode arrangement and white reflector as in FIGS. 8A and 8B but with cyan, magenta and yellow particles similar to those shown in FIGS. 4A-4D. As shown in FIG. 9A, a white state is displayed by setting one rear electrode negative relative to the front electrode, so that the [CM] aggregate collects on this electrode, and setting the other rear electrode positive relative to the front electrode, so that the yellow particles 107 collect on this electrode. Thus, all particles are shuttered and the white reflector is exposed. As FIGS. 9B-9E illustrate, the blue (913), yellow (914), cyan (915) and red (916) color states are obtained as previously described with reference to FIGS. 7A-7D respectively by varying the applied electrical fields between positive and negative, and below and above the threshold (900-907). In all four cases, the difference between the two separate rear electrodes in FIGS. 9B-9E and the single rear electrode in FIGS. 7A-7D is irrelevant since both rear electrodes are held at the same potential and the white reflector is masked by the particles adjacent the front electrode. The magenta (917), green (918) and black (919) states are transient states obtained by beginning from the white state shown in FIG. 9A and applying opposed potentials to the backplane electrodes, either below the threshold or above the threshold, but ceasing to apply these potentials (or applying an AC field, as described below) before the display reaches one of the stable states shown in FIGS. 9B-9E.

More specifically, the magenta state shown in FIG. 9F is produced starting from the white state shown in FIG. 9A by increasing the potentials of the two backplane electrodes from +V and −V to +$V_t$ and −$V_t$ respectively. The negatively charged yellow particles are not affected by the increased potential and maintain their position. However, since the electric field is now above the threshold, the [CM] aggregate deaggregates to provide separate cyan and magenta particles. The positively charged cyan particles maintain their position adjacent the negatively charged backplane electrode. However, the negatively charged magenta particles will be drawn to the positively charged backplane electrode and will cross and mask the white reflector, thus producing a transient magenta state, as illustrated in FIG. 9F.

The green state shown in FIG. 9G is produced starting from the white state shown in FIG. 9A by reversing the potentials of the two backplane electrodes from +V and −V to −$V_t$ and +$V_t$ respectively. The negatively charged yellow particles will be drawn to the positively charged backplane electrode and will cross and mask the white reflector. Also, since the electric field is now above the threshold, the [CM] aggregate deaggregates to provide separate cyan and magenta particles. The negatively charged magenta particles maintain their position adjacent the now positively charged backplane electrode, but the positively charged cyan particles will be drawn to the negatively charged backplane electrode and will cross and mask the white reflector. The combination of the yellow and cyan particles crossing and masking the white reflector produces a transient green state, as illustrated in FIG. 9G.

Finally, the black state shown in FIG. 9H is produced starting from the white state shown in FIG. 9A by reversing the potentials of the two backplane electrodes from +V and −V to −V and +V respectively. Since the electric field is still below the threshold, the [CM] aggregates remain aggregated, and the reversal of the polarities of the backplane electrodes causes both the yellow particles and the [CM] aggregates to move to the opposite backplane electrode, so that both the yellow particles and the [CM] aggregates cross and mask the white reflector, as illustrated in FIG. 9H. The combination of the yellow particles and the [CM] aggregates masking the white reflector produces a black state.

As already indicated, each of the three transient colored states illustrated in FIGS. 9F-9H may be maintained for a short time by ceasing the apply electrical fields to the pixel (for example by setting all electrodes to the same potential, typically ground) and relying upon the inherent bistability of electrophoretic displays to maintain the transient state. The black state shown in FIG. 9H may be maintained by addressing the pixel with an alternating electric field, such as low-frequency AC to induce swirling so that the particles are mixed. The magenta and green transient states, like the black state, may also be maintained with AC driving. The AC field used to maintain the black state must be of higher frequency approximately 10-50 Hz (922), as compared to the magenta and green states which may be maintained using AC driving at approximately 1 Hz.

Figure 10:
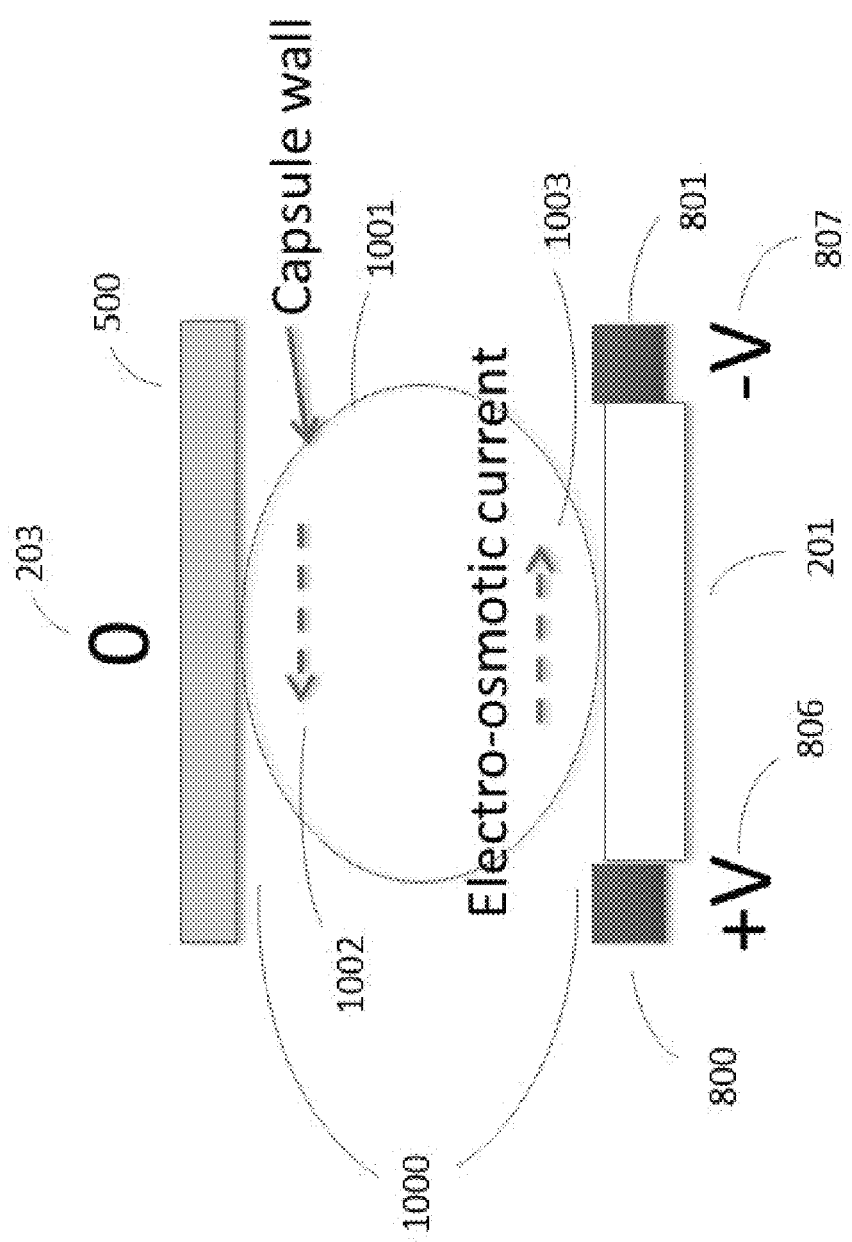
FIG. 10 is a schematic side elevation of a single pixel of an electrophoretic display of the present invention generally similar to that shown in FIGS. 8A-8B and showing the electro-osmotic flow of encapsulated, positively charged particles when one rear electrode is held positive and the other negative relative to the front electrode.

FIG. 10 illustrates that in encapsulated displays (1000), the magenta and green transient states may be bolstered by the electro-osmotic current that inevitably flows as a result of the capsule wall charge. If the capsule wall (1001) is negatively charged, the positively-charged pigment moves in the same direction as the electro-osmotic flow (1003), while the negatively-charged particle moves in the opposite direction (1002) to the flow. The transient magenta state of FIG. 9F may be fairly long-lived, as the magenta pigment cannot travel in a direct path from one lateral electrode to the other.

The electrophoretic media in the above examples may be encapsulated or incorporated into micro-cups or channels, as is known in the art.

The displays of the present invention may be used in any application in which prior art electro-optic displays have been used. Thus, for example, the present displays may be used in electronic book readers, portable computers, tablet computers, cellular telephones, smart cards, signs, watches, shelf labels, variable transmission windows and flash drives.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

What is claimed is:

1. A method of driving a color display device, the device including:
    a front electrode and a rear electrode on opposed sides of an electrophoretic medium;
    a voltage control means for applying a first potential difference and a second potential difference smaller than the first potential difference of either polarity;
    the front electrode occupying only a minor proportion of the area of the pixel;
    the rear electrode having first and second rear electrodes with the voltage control means arranged to control the potential of the first and second rear electrodes independently of each other;
    a rear reflector;
    the electrophoretic medium having a first, second and third species of particles;
    the first particles having a first color and a first charge polarity and a first magnitude,
    the second particles having a second color, having a second charge polarity different from the first species of particles and having a second magnitude different from the first species of particles;
    the third particles having a third color different from the first and second colors, having the same charge polarity as the first particles, and not forming aggregates, but forming a fourth color when displayed with the first particles;
    the first, second and third particles moving independently of one another in response to the first potential difference applied between the electrodes, but upon application of the second potential difference the first and second particles forming charged aggregates, moving as a unit, having an aggregate color different from the first, second and third colors,
    the method comprising:
    applying the first potential difference of one polarity between the electrodes to move the first, second and third particles independently of one another, with the first and third particles moving to the rear electrode and the second particles moving to the front electrode to display a second color;
    applying the first potential difference of the opposite polarity between the electrodes to move the first, second and third particles independently of one another, with the second particles moving to the rear electrode and the first and third particles moving to the front electrode to display a fourth color;

forming aggregate charged particles by applying an alternating electric field, then applying the second potential difference between the electrodes to form aggregate charged particles;

applying the second potential difference of one polarity to move the aggregate particles to the first and second rear electrodes and the third particles to the front electrode to display the third color;

applying the second potential difference of the opposite polarity to move the aggregate particles to the front electrode and the third particles to the first and second rear electrodes to display the aggregate color; and rendering the first rear electrode positive relative to the front electrode by the second potential difference and the second rear electrode negative relative to the front electrode by the second potential difference to move the third particles to the first rear electrode and the aggregate particles to the second rear electrode to display the rear reflector color.

2. A method according to claim 1, the device further comprising the third particles forming a fifth color when displayed with the second particles and forming a sixth color when displayed with the charged aggregates, the method further comprising:

rendering the first rear electrode positive relative to the front electrode by the first potential difference and the second rear electrode negative relative to the front electrode by the first potential difference to move the third particles to the first rear electrode and the second particles to the second rear electrode to display the first color;

rendering the first rear electrode negative relative to the front electrode by the first potential difference and the second rear electrode positive relative to the front electrode by the first potential difference to move the first particles to the second rear electrode to display the fifth color; and applying an alternating electric field to form charged aggregates and rendering the first rear electrode negative relative to the front electrode by the second potential difference and the second rear electrode positive relative to the front electrode by the second potential difference to move the aggregates and the third particles to between the front and rear electrodes to display the sixth color.

3. A method according to claim 1, wherein the first color is magenta, the second color is cyan and the third color is yellow.

4. A method according to claim 3, wherein the states displayed are blue, yellow, cyan, red and white.

5. A method according to claim 2, wherein the first color is magenta, the second color is cyan and the third color is yellow.

6. A method according to claim 5, wherein the states displayed are blue, yellow, cyan, red, white, magenta, green and black.

7. A method of driving a multi-color display device, the device including:

a front electrode and a rear electrode on opposed sides of an electrophoretic medium;

one of the front and rear electrodes occupying only a minor proportion of the area of the pixel;

a voltage control means for applying a first potential difference and a second potential difference smaller than the first potential difference of either polarity;

a rear reflector;

the electrophoretic medium having a first and second species of particles;

the first particles having a first color and a first charge polarity, the second particles having a second color and a second charge polarity different from the first species of particles; and the first and second particles moving independently of one another in response to the first potential difference applied between the electrodes, but upon application of the second potential difference forming charged aggregates, moving as a unit, having an aggregate color different from the first and second colors, the method comprising:

applying the first potential difference of one polarity between the electrodes to move the first and second particles independently of one another, with the first particles moving to the rear electrode to display the first color;

applying the first potential difference of the opposite polarity between the electrodes to move the first and second particles independently of one another, with the second particles moving to the rear electrode to display the second color;

forming aggregate charged particles by applying an alternating electric field, then applying the second potential difference between the electrodes to form aggregate charged particles;

applying the second potential difference of one polarity to move the aggregate particles to the rear electrode to display the aggregate color; and applying the second potential difference of the opposite polarity to move the aggregate particles to the front electrodes to display the color of the rear reflector.

8. A method of claim 7, wherein magenta is the first color and cyan is the second color.

9. A method of driving a multi-color display device, the device including:

a front electrode and a rear electrode on opposed sides of an electrophoretic medium;

one of the front and rear electrodes occupying only a minor proportion of the area of the pixel;

a voltage control means for applying a first potential difference and a second potential difference smaller than the first potential difference of either polarity;

a rear reflector;

the electrophoretic medium having a first, second and third species of particles;

the first particles having a first color and a first charge polarity, the second particles having a second color and a second charge polarity different from the first species of particles;

the first and second particles moving independently of one another in response to the first potential difference applied between the electrodes, but upon application of the second potential difference forming charged aggregates, moving as a unit, having an aggregate color different from the first and second colors, and the third particles having a third color, having the same charge polarity as the first particles, and not forming aggregates, but forming a fourth color when displayed with the first particles of the same polarity, the method comprising:

applying the first potential difference of one polarity between the electrodes to move the first, second and third particles independently of one another, with the first and third particles moving to the rear electrode to display a fourth color;

applying the first potential difference of the opposite polarity between the electrodes to move the first, second and third particles independently of one another, with the second particles moving to the rear electrode to display the second color;

forming aggregate charged particles by applying an alternating electric field, then applying the second potential difference between the electrodes to form aggregate charged particles;

applying the second potential difference of one polarity to move the third particles to the front electrodes and the aggregate particles to the rear electrode to display the aggregate color; and applying the second potential difference of the opposite polarity to move the aggregate particles to the front electrodes and the third particles to the rear electrode to display the third color.

10. A method according to claim 9, wherein the first color is magenta, the second color is cyan and the third color is yellow.

11. A multi-color display device comprising:
a front electrode and a rear electrode on opposed sides of an electrophoretic medium;
one of the front and rear electrodes occupying only a minor proportion of the area of the pixel;
a voltage control means for applying a first potential difference and a second potential difference smaller than the first potential difference of either polarity;
a rear reflector;
the electrophoretic medium having at least first and second species of particles;
the first particles having a first color and a first charge polarity,
the second particles having a second color and a second charge polarity different from the first species of particles, and
the first and second particles moving independently of one another in response to the first potential difference applied between the electrodes, but upon application of the second potential difference forming charged aggregates, moving as a unit, having an aggregate color different from the first and second colors.

12. A multi-color display device according to claim 11, wherein one of the first and second particles of the charged aggregates moves in the opposite direction when the second potential difference is applied from when the first potential difference is applied.

13. A multi-color display device according to claim 11, wherein the front electrode occupies only a minor proportion of the area of the pixel.

14. A multi-color display device according to claim 11, wherein the rear electrode occupies only a minor proportion of the area of the pixel.

15. A multi-color display device according to claim 11 having four color states.

16. A multi-color display device according to claim 11, wherein the first color is magenta and the second color is cyan.

17. A multi-color display device according to claim 16 having four color states of white, blue, magenta and cyan.

18. A multi-color display device according to claim 11, further comprising a third species of particles having a third color, having a polarity the same as one of the first and second particles, and not forming aggregates.

19. A multi-color display device according to claim 18, wherein the third color is yellow.

20. A multi-color display device according to claim 19 having four color states of yellow, blue, red and cyan.

21. A multi-color display device comprising:
a front electrode and a rear electrode on opposed sides of an electrophoretic medium;
a voltage control means for applying a first potential difference and a second potential difference smaller than the first potential difference of either polarity;
the front electrode occupying only a minor proportion of the area of the pixel;
the rear electrode having first and second rear electrodes with the voltage control means arranged to control the potential of the first and second rear electrodes independently of each other;
a rear reflector;
the electrophoretic medium having a first, second and third species of particles;
the first particles having a first color and a first charge polarity and a first magnitude,
the second particles having a second color, having a second charge polarity different from the first species of particles and having a second magnitude different from the first species of particles;
the third particles having a third color different from the first and second colors, having a third charge polarity different from one of the first and second charge polarities, having a third charge magnitude different from one of the first and second charge magnitudes, and not forming aggregates;
the first, second and third particles moving independently of one another in response to the first potential difference applied between the electrodes, but upon application of the second potential difference the first and second particles forming charged aggregates, moving as a unit, having an aggregate color different from the first, second and third colors.

22. A multi-color display device according to claim 21, wherein the first color is cyan, the second color is magenta and the third color is yellow.

23. A multi-color display device according to claim 21 having at least five color states.

24. A multi-color display device according to claim 21 having eight color states.

25. A multi-color display device according to claim 22 having eight color states of blue, yellow, cyan, red, magenta, green, white and black.

* * * * *